(12) United States Patent
Cheng et al.

(10) Patent No.: US 8,407,437 B1
(45) Date of Patent: Mar. 26, 2013

(54) SCALABLE METADATA ACCELERATION WITH DATAPATH METADATA BACKUP

(75) Inventors: Wen-Chen Cheng, Los Altos, CA (US); Rajesh Nair, Bangalore (IN)

(73) Assignee: Tegile Systems, Inc., Newark, CA (US)

( * ) Notice: Subject to any disclaimer, the term of this patent is extended or adjusted under 35 U.S.C. 154(b) by 0 days.

(21) Appl. No.: 13/419,641

(22) Filed: Mar. 14, 2012

(51) Int. Cl.
*G06F 12/00* (2006.01)

(52) U.S. Cl. ........ 711/162; 711/103; 711/104; 711/114; 711/156; 711/170

(58) Field of Classification Search .................. None
See application file for complete search history.

(56) References Cited

U.S. PATENT DOCUMENTS

| | | | |
|---|---|---|---|
| 7,032,125 | B2 | 4/2006 | Holt et al. |
| 7,873,619 | B1 | 1/2011 | Faibish et al. |
| 2011/0145516 | A1* | 6/2011 | Adl-Tabatabai et al. ..... 711/152 |
| 2011/0258374 | A1 | 10/2011 | Pertocelli |

* cited by examiner

*Primary Examiner* — Shawn X Gu
(74) *Attorney, Agent, or Firm* — Lyman Moulton, Esq.

(57) ABSTRACT

A system, method and computer program product for scalable metadata acceleration with datapath metadata backup as disclosed includes providing a plurality of metadata comprising variable block pointers for the physical location of system data. The method also includes storing at least a first and a second metadata in two or more solid state memories accelerated with respect to a read and a write of a memory in a datapath, each solid state memory configured as a logical copy of the other. The method additionally includes interleaving a backup metadata in a datapath memory at a variable interval based on a table of block pointers. The method further includes querying the accelerated metadata for an accelerated datapath operation of the system and querying the interleaved metadata and/or a logical mirror of the accelerated metadata for a rebuild operation of the accelerated metadata, each query determinable by the table of block pointers.

20 Claims, 15 Drawing Sheets

SCALABLE METADATA ACCELERATION WITH DATAPATH METADATA BACKUP

BACKGROUND OF THE INVENTION

The present disclosure relates to a storage area network (SAN) and network-attached storage (NAS) systems for block and file memory storage versus object addressable data storage systems. A SAN is a high-speed special-purpose network (or sub-network) that interconnects different kinds of data storage devices with associated data servers on behalf of a larger network of users. SANs support disk mirroring, backup and restore, archival and retrieval of archived data, data migration from one storage device to another and the sharing of data among different servers in a network. SANs may incorporate sub-networks with network-attached storage (NAS) systems.

A network-attached storage (NAS) is hard disk storage that is set up with its own network address rather than being attached to a department computer that is serving applications to a networks workstation users. By removing storage access and its management from the department server, both application programming and files may be served faster because they are not competing for the same processor resources. The network-attached storage device may be attached to a local area network (typically, an Ethernet network) and assigned an IP address.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system. In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

The typical approach to providing a high performance digital storage system has been to include high RPM (revolutions per minute) drives and to increase the number of drives available to distribute the memory storage load. However, this approach has increased the initial system cost to acquire a large number of expensive disks and has also increased ongoing costs to power and cool these disks. Metadata, or data describing data, has therefore been utilized to compress data and to avoid storage of duplicate copies of compressed data by storing the location of duplicate copies in memory.

In traditional storage systems, metadata is stored on the disk itself. When data is being written or read from disk, the storage system has to write or read the metadata as well. This adds to the overhead of the overall write or read operation in terms of access time and latency as well as to hardware costs. There is therefore a long felt need for a block and file storage system with accelerated metadata management capable of scaling to larger disk storage.

SUMMARY OF THE INVENTION

A system, method and computer program product for scalable metadata acceleration with datapath metadata backup is disclosed. The method includes providing a plurality of accelerated metadata comprising block pointers for the physical location of system data and deduplication, backup, compression, redundancy, error correction, rebuild, access and encryption data. The method also includes storing at least a first and a second metadata of the metadata plurality in two or more solid state memories accelerated with respect to a read and a write of a memory in a datapath, each solid state memory configured as a logical copy of the other. The method additionally includes interleaving a backup metadata in a datapath memory, the datapath configured to read and write the backup metadata in the datapath memory at a variable interval based on a table of block pointers. The method further includes querying the accelerated metadata for an accelerated datapath operation of the system and querying the interleaved metadata for a rebuild operation of the accelerated metadata, each query determinable by the table of block pointers. Therefore, because accelerated metadata is used for read and write operations of the datapath, all datapath read and write operations of the disclosed storage system are accelerated. The accelerated datapath enables updating the accelerated metadata and updating the backup metadata concurrently and thereby accelerating a write of the interleaved backup metadata. The disclosure allows the non-accelerated and interleaved backup metadata to be available for rebuild or restore operations of the accelerated metadata. The metadata backup may also be used to restore or rebuild accelerated metadata in combination with a mirrored copy of the metadata or the mirrored copy may be used exclusively in the rebuild. The accelerated metadata may conversely be used to restore or rebuild the backup metadata interleaved in a datapath memory.

Solid state metadata storage memories may be scaled in an embodiment to include an additional pair multiple in a RAID 1+0 configuration to accommodate a scalable datapath memory including a JBOD chassis slot expansion and the like. Additionally, metadata may be interleaved in the datapath at a single or multiple variable intervals determined by the table of variable block pointers and the interleaved metadata variable offset to the respective block pointer. The disclosed system, method and computer program product may also perform an inline (on the fly) data compression/decompression and deduplication of the accelerated metadata during a read of the datapath and a write of the datapath.

Other aspects and advantages of embodiments of the disclosure will become apparent from the following detailed description, taken in conjunction with the accompanying drawings, illustrated by way of example of the principles of the disclosure.

Figure 1:
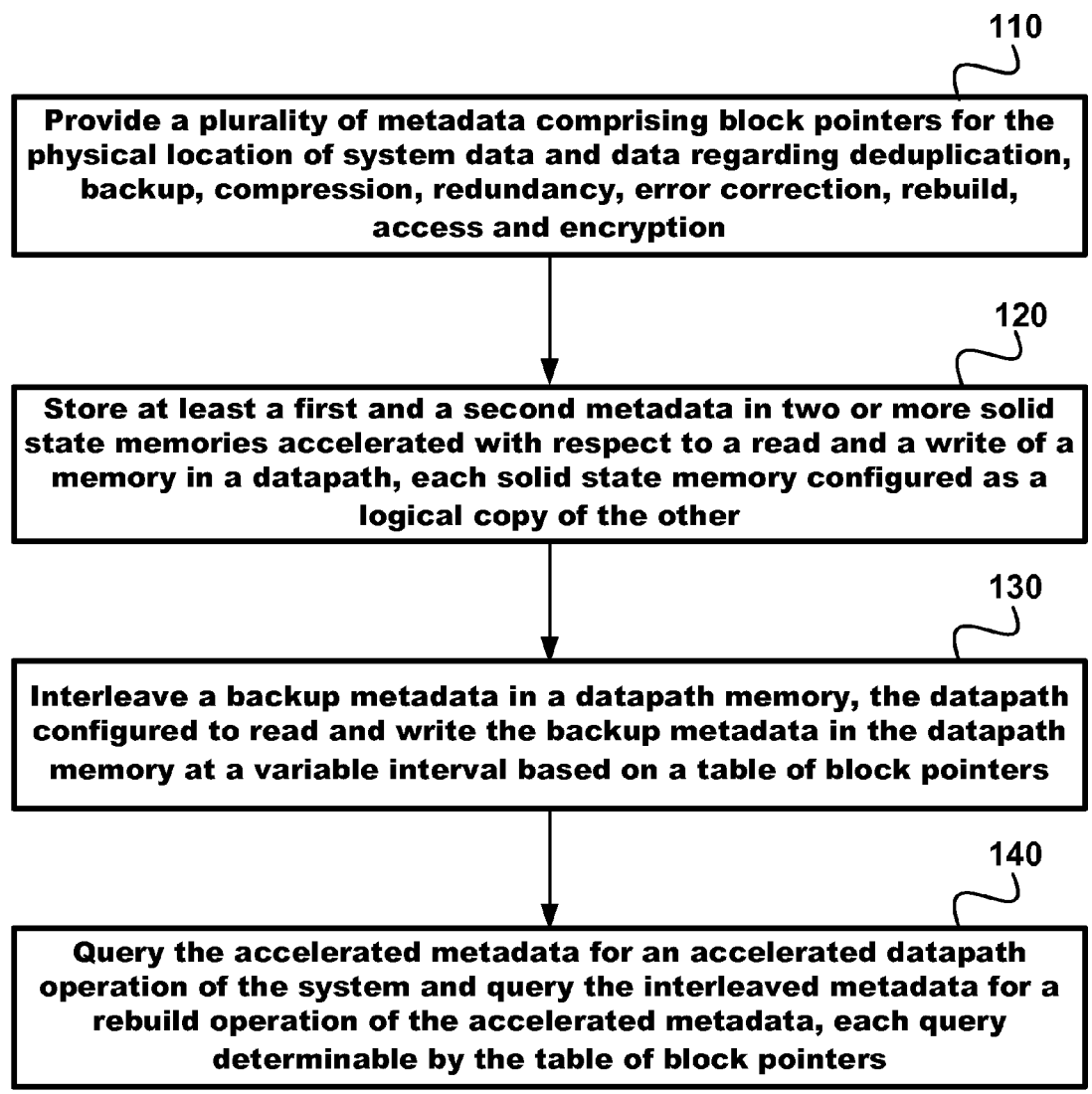
FIG. 1 is a flow chart of a method for scalable metadata acceleration with datapath metadata backup in accordance with an embodiment of the present disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The present disclosure comprises accelerated SSD (solid state device) flash drives that are dedicated for metadata and data storage. Though an SSD may sometimes be referred to as a solid state disk, SSD flash drives have no moving head and can therefore provide a magnitude better performance compared to high RPM disk drives. Since a metadata lookup or query is often the critical path for a read and write of data, the critical path savings for accelerated metadata is passed on to all data operations. In other words, all datapath metadata may reside on dedicated SSDs and hence any datapath write or read operations comprising a metadata query may be accelerated compared to non-accelerated storage architectures. The present disclosure also takes advantage of SSD flash drives as a second layer of cache in addition to the primary RAM cache. This may enable lower cost disk drives to be used as backend storage disks depending on the spatial locality characteristics of the data to be stored. Scalability of the present disclosure therefore may refer not only to adding more disk memory for data but also may refer to adding more accelerated memory for metadata and for dataflow in an accelerated datapath.

FIG. 1 is a flow chart of scalable metadata acceleration with datapath metadata backup in accordance with an embodiment of the present disclosure. The method includes providing 110 a plurality of metadata comprising block pointers for the physical location of system data and deduplication, backup, compression, redundancy, error correction, rebuild, access and encryption data. The method also includes storing 120 at least a first and a second metadata of the metadata plurality in two or more solid state memories accelerated with respect to a read and a write of a memory in a datapath, each solid state memory configured as a logical copy of the other. The method additionally includes interleaving 130 a backup metadata in a datapath memory, the datapath configured to read and write the backup metadata in the datapath memory at a variable interval based on a table of block pointers. The method further includes querying 140 the accelerated metadata for an accelerated datapath operation of the system and querying the interleaved metadata for a rebuild operation of the accelerated metadata, each query determinable by the table of block pointers. A rebuild operation recovers metadata lost through hardware or software anomalies. A rebuild operation therefore may gather failed metadata from existing backups interleaved on the datapath or on an accelerated memory storage device. Throughout the present disclosure, the term 'interleaved' may refer to an interval arrangement of metadata interspersed with other data in the datapath data space. In other words, the metadata may be arranged at even or odd addressed intervals, or contiguous or disparate intervals interspersed with datapath data. Also, the term 'datapath' may refer throughout the present disclosure to the path that data may take from a source memory to a destination memory including all cache memory or intermediary memories and processes therein. Various mechanisms are available to detect and flag failed and/or lost metadata such as parity and error detection schemes, etc. A metadata build may refer to an initial writing of metadata at the time of data creation, storage and subsequent edit and storage of the information for compression and deduplication and other storage schemes.

Figure 2:
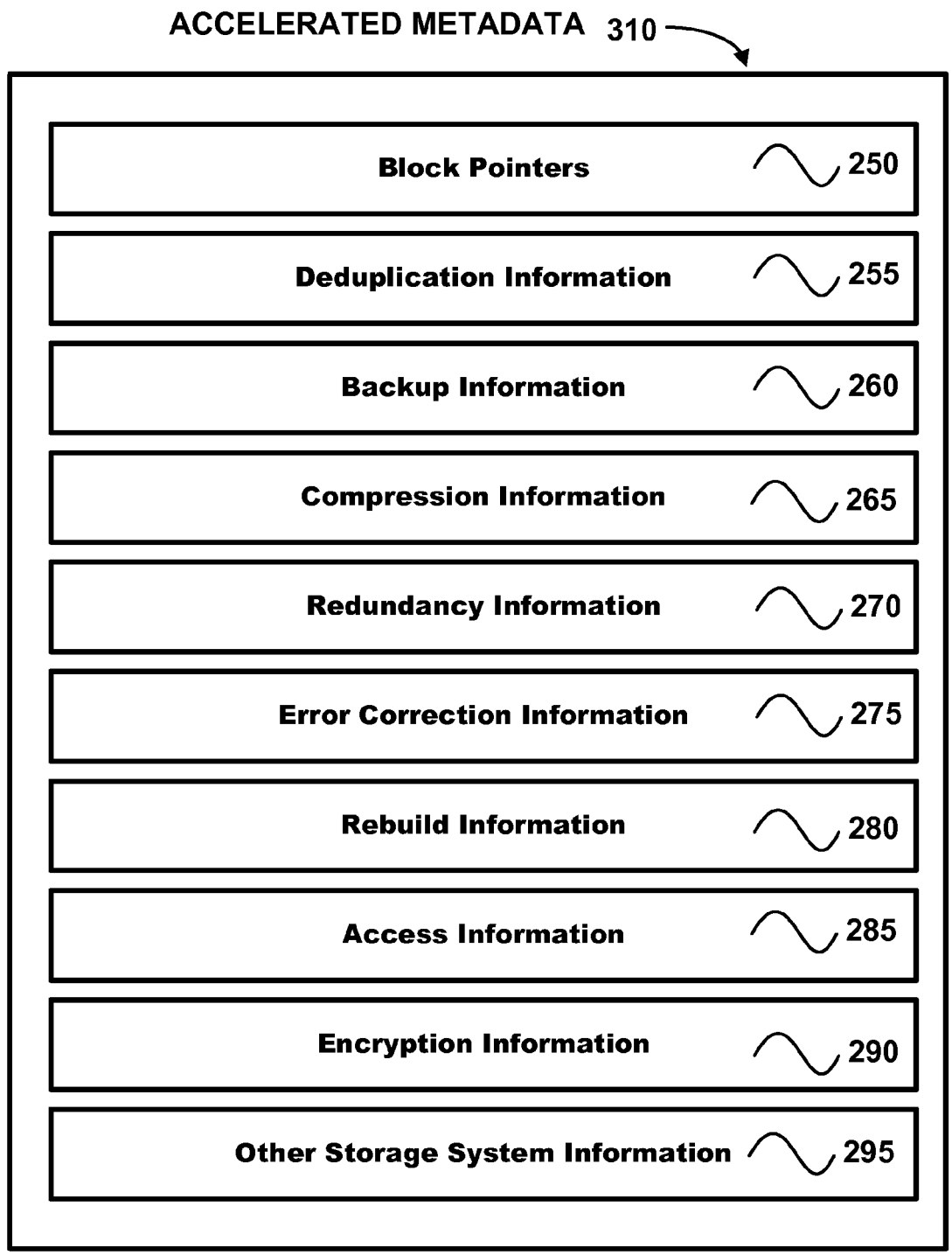
FIG. 2 is a block diagram of metadata for scalable metadata acceleration with datapath metadata backup in accordance with an embodiment of the present disclosure.

FIG. 2 is a block diagram of metadata for scalable metadata acceleration with datapath metadata backup in accordance with an embodiment of the present disclosure. The accelerated metadata 310 may include block pointers 250, deduplication information 255, backup information 260, compression information 265, redundancy information 270, error correction information 275, rebuild metadata information 280, access information 285, encryption information 290 and other storage system information 295. Additionally, a plurality of metadata may further include information regarding error correction schemes, data compression algorithms, RAID (redundant array of independent disks/devices) level implemented on a data block and whether a block belongs to one of a file and a LUN (logical unit number) with an offset address for SAN and NAS. Metadata for object addressable data storage systems may also be comprised in embodiments of the present disclosure.

The two or more solid state memories may comprise a non-volatile semiconductor memory, a ferroelectric RAM (random access memory), a magneto-resistive RAM, a DRAM (dynamic random access memory), an SRAM (static random access memory) memory and any combination of solid state memory and the like. Each solid state memory device may be configured in any logical minor arrangement including two and three ways minors. The solid state memories may also be configured in any RAID arrangement. An inline (on the fly) data compression/decompression and deduplication of the accelerated metadata during a read of the datapath and a write of the datapath is comprised in embodiments of the disclosure.

Figure 3:
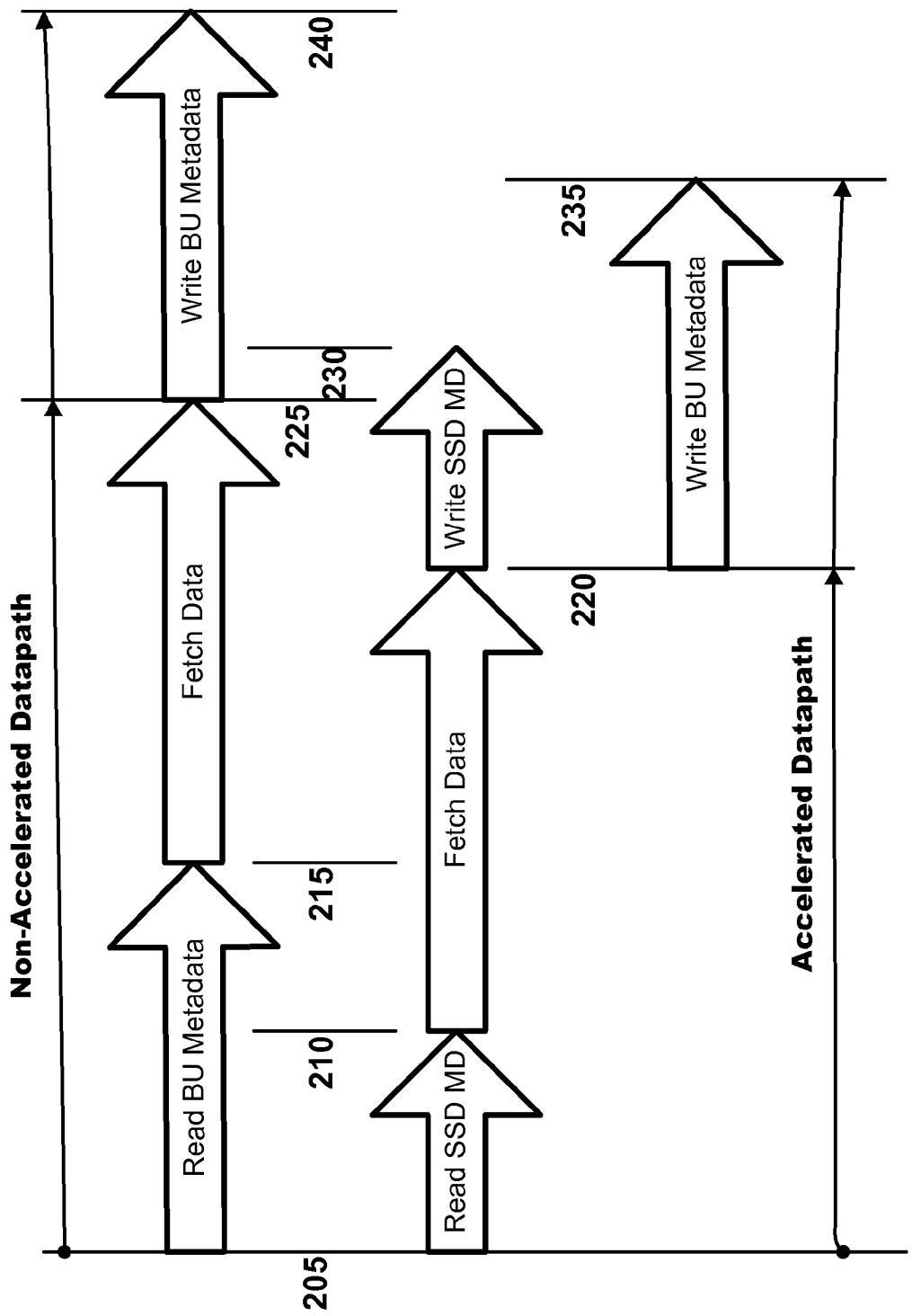
FIG. 3 is a timing chart for a metadata query and a data fetch operation of a non-accelerated datapath and an accelerated datapath in accordance with an embodiment of the present disclosure.

FIG. 3 is a timing chart for a metadata query and data fetch operation of a non-accelerated datapath and an accelerated datapath in accordance with an embodiment of the present disclosure. At time 205 a read SSD metadata (MD) and a read backup (BU) metadata query are initiated by a server. The SSD metadata read is completed at time 210 while the BU metadata read to mechanical disk is still in progress and finishes sometime later at time 215. Depending on the size and generation of respective technologies, the SSD metadata read may be many times faster than the BU metadata read. Data Fetch, also known as a data read for both processes, reads data from the datapath memory and may therefore be the same latency for each process. A fetch data from a read of the SSD metadata finishes at time 220 while the fetch data from a read of the BU metadata finishes at a later time 225. Once the respective data is read it may be determined that the metadata needs to be updated per a change or modification to the data. The SSD metadata write finishes at time 230 and a write of the backup metadata from the accelerated datapath may occur concurrently and finish at time 235. However, the write to BU metadata from the non-accelerated datapath finishes sometime later at time 240. In an embodiment of the disclosure, an accelerated datapath cycle may start and finish both a read and a write to an SSD metadata including a write to BU metadata in the datapath before a non-accelerated cycle finishes. The disclosure also enables updating the accelerated metadata and updating the backup metadata concurrently. Therefore, even a write to the BU metadata in the disclosure is accelerated. Because accelerated metadata is used for read and write operations of the datapath, all datapath read and write operations of the disclosed storage system are accelerated and the performance of the disclosed system as a whole is also accelerated.

Figure 4:
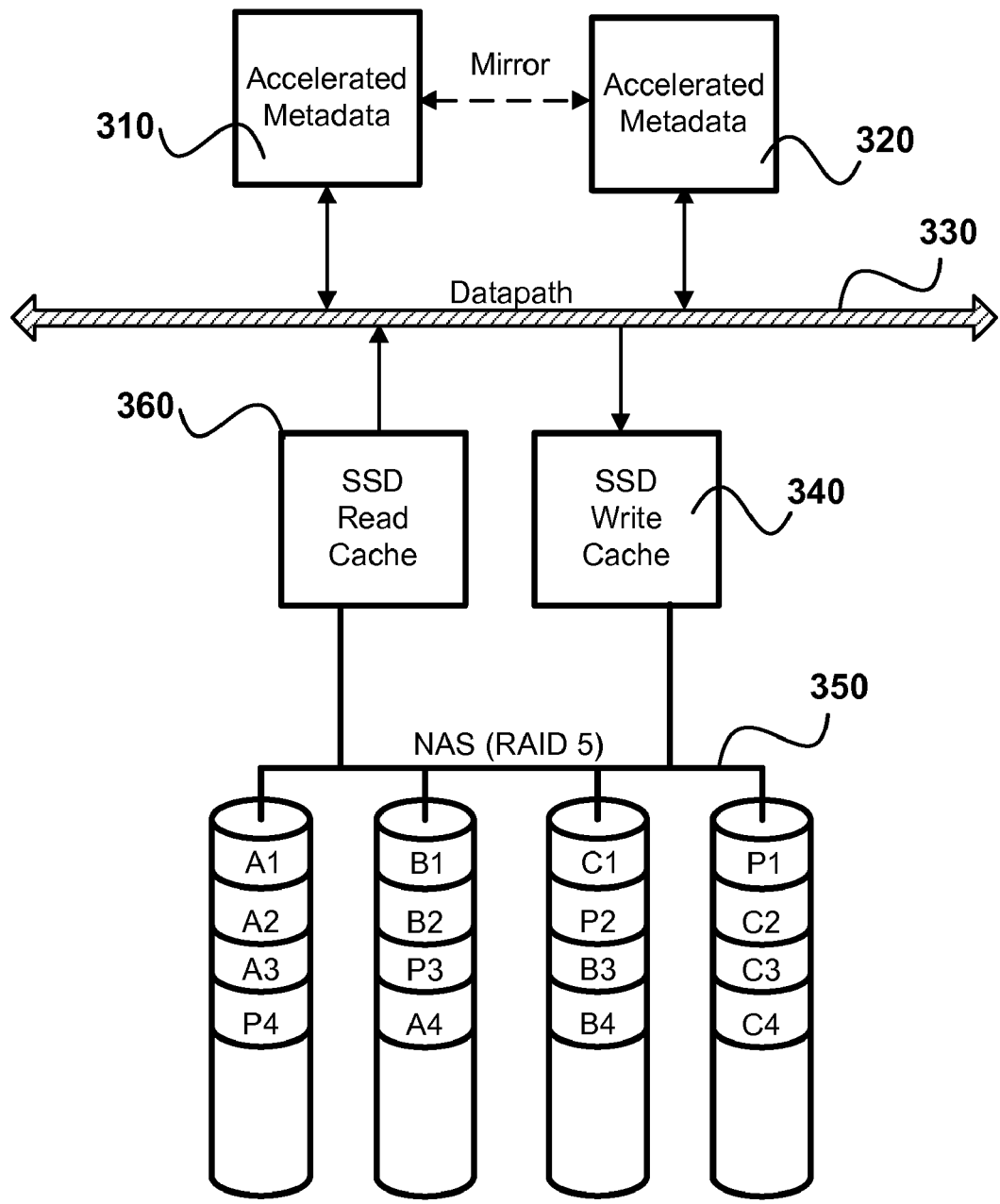
FIG. 4 is a block diagram of an accelerated datapath memory for scalable metadata acceleration with datapath backup in accordance with an embodiment of the present disclosure.

FIG. 4 is a block diagram of an accelerated datapath memory for scalable metadata acceleration with datapath metadata backup in accordance with an embodiment of the present disclosure. The accelerated system depicted includes a first accelerated metadata 310 SSD and a second accelerated metadata 320 SSD. The first 310 and second accelerated metadata 320 may be configured as logical mirror copies of each other and may be accessed by the system via the datapath 330. As a logical mirror of the first metadata 310, the second metadata 320 may be written from the first metadata 310 concurrently with a write of the first metadata 310 or during other times and cycles. Data in the disclosed system may be written via the datapath 330 and an SSD write cache 340 to a RAID 350. Data in the disclosed system may also be written via the accelerated datapath 330 and an SSD read cache 350 from the RAID 350. Though a RAID 5 is depicted, any RAID configuration may also be used in embodiments of the present disclosure.

Figure 5:
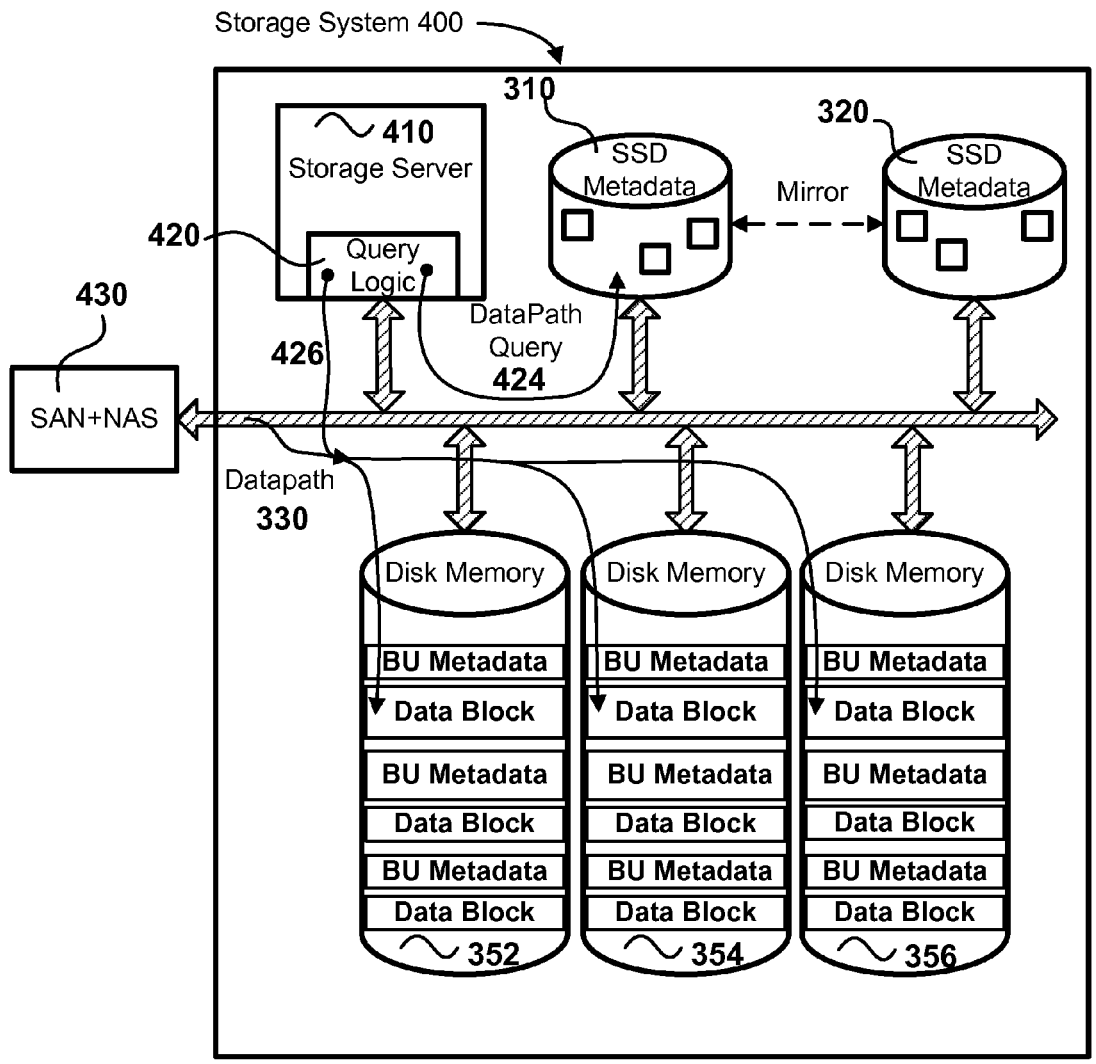
FIG. 5 is a block diagram of scalable metadata acceleration with datapath metadata backup in accordance with an embodiment of the present disclosure.

FIG. 5 is a block diagram of scalable metadata acceleration with datapath metadata backup in accordance with an embodiment of the present disclosure. The storage system 400 may include a first accelerated metadata 310 SSD, a second accelerated metadata memory 320 SSD, an accelerated datapath 330, a first storage disk 352, a second storage disk 354 and a third storage disk 356. Though only 3 disks are depicted, any number of disks may be configured into any logical array including RAID and JBOD etc. The storage system 400 may also include a storage server 410 comprising query logic 420. The storage server 410 and associated query logic 420 may also reside outside the storage system 400. A SAN+NAS 430 system is in communication with the storage system on the accelerated datapath 330. Even though a write cache and a read cache are not depicted as in FIG. 3, the datapath 330 is still accelerated by virtue of the metadata query 424 serviced through the accelerated metadata. The datapath may be queried as depicted by line 426. Data control signals may also be comprised in the accelerated datapath 330. Backup metadata (BU Metadata) may be interleaved in the first, second and third datapath storage disks 352, 354 and 356 configured to read and write the backup metadata in the disks at a variable interval based on a table of variable block pointers and an interleaved metadata variable offset to a respective block pointer. The backup metadata (BU Metadata) may also be interleaved in the datapath storage disks 352, 354 and 356 at a plurality of variable intervals determined by the table of variable block pointers and the interleaved metadata variable offset to the respective block pointer as further explained below.

Figure 6:
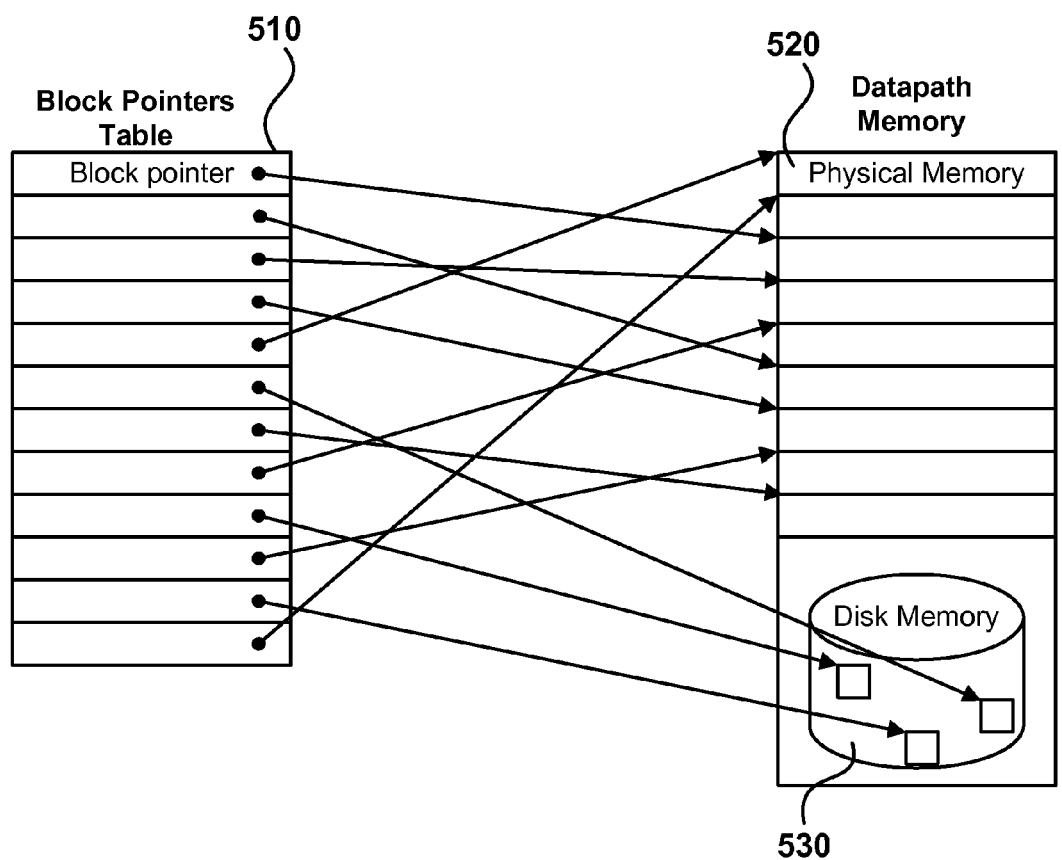
FIG. 6 is a block diagram of a block pointers table and mapping to physical memory in the accelerated datapath in accordance with an embodiment of the present disclosure.

FIG. 6 is a block diagram of a block pointers table and representative mapping to physical memory in the accelerated datapath in accordance with an embodiment of the present disclosure. The block pointers table 510 may comprise block pointers also known as memory addresses (denoted by arrows) which point to one of a physical memory 520 storage in the accelerated datapath. A physical memory may be a disk memory 530 destination. An accelerated datapath operation of the disclosed system may comprise a plurality of metadata queries of the table of block pointers 510 for a read and a write of system data in the datapath comprising SAN and NAS, data deduplication, data compression, parity and redundancy and error correction.

Figure 7:
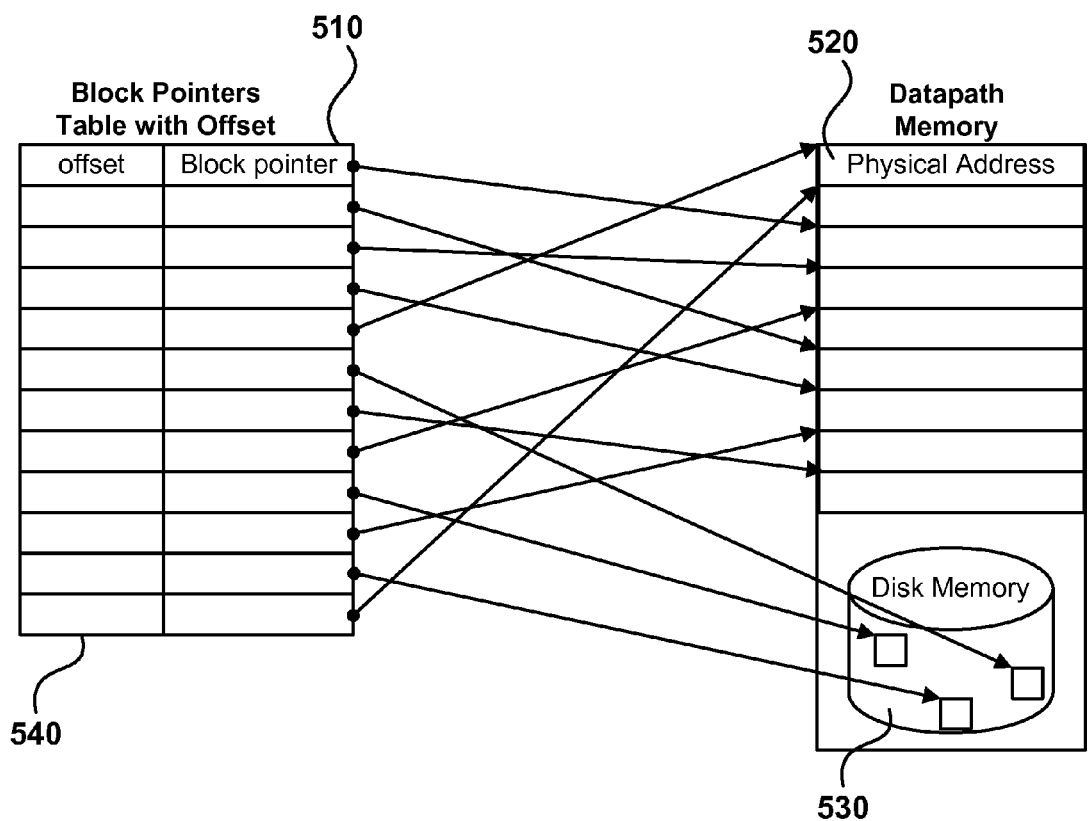
FIG. 7 is a block diagram of a block pointers table with offset and mapping to physical memory in the accelerated datapath in accordance with an embodiment of the present disclosure.

FIG. 7 is a block diagram of a block pointers table with offset and mapping to physical memory in the accelerated datapath in accordance with an embodiment of the present disclosure. The block pointers table 510 may comprise block pointer addresses and respective offsets (denoted by arrows) which may point to a physical memory 520 in the accelerated datapath. A physical memory may be a disk memory 530 destination or a solid state disk memory destination. The metadata (as depicted on the disks 352, 354 and 356) may have different block sizes depending on the characteristics of the data the metadata describes. Therefore, an offset pointer may be used to determine the block address for the data and associated metadata. The offset may also allow the data block size to vary. This variable interval between blocks of data and metadata may allow greater flexibility in interleaving metadata with data in the datapath in embodiments of the present disclosure. Embodiments of the disclosure may also comprise a block pointers table with no offset as depicted above in FIG. 5 when metadata content or data content is variable but addressed at specific intervals in physical memory.

Figure 8:
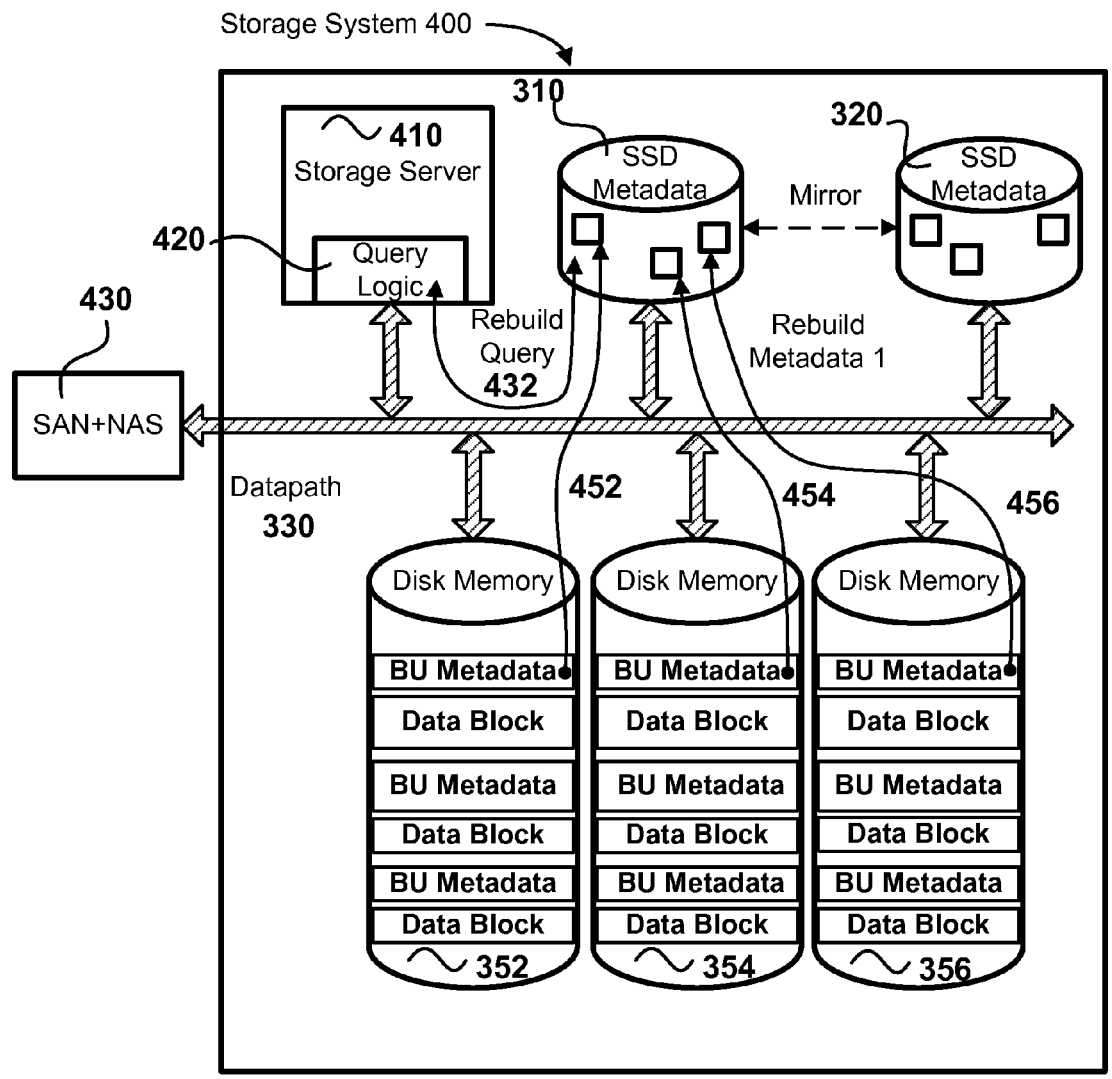
FIG. 8 is a block diagram of datapath metadata backup for accelerated metadata in accordance with an embodiment of the present disclosure.

FIG. 8 is a block diagram of datapath metadata backup for accelerated metadata in accordance with an embodiment of the present disclosure. The elements and features detailed above in FIG. 5 may be the same or similar in FIG. 8 as depicted in the storage system 400. The rebuild query 432 of the accelerated metadata 310 may determine that a rebuild or restore of the accelerated metadata is necessary and that the rebuild or restore metadata is to be read from the interleaved backup metadata into the accelerated metadata per the table of block pointers. Therefore, metadata is gathered from the datapath disks 352, 354 and 356 and written into the accelerated SSD 310 via respective read operations 452, 454 and 456 labeled collectively as 'Rebuild Metadata 1.'

Figure 9:
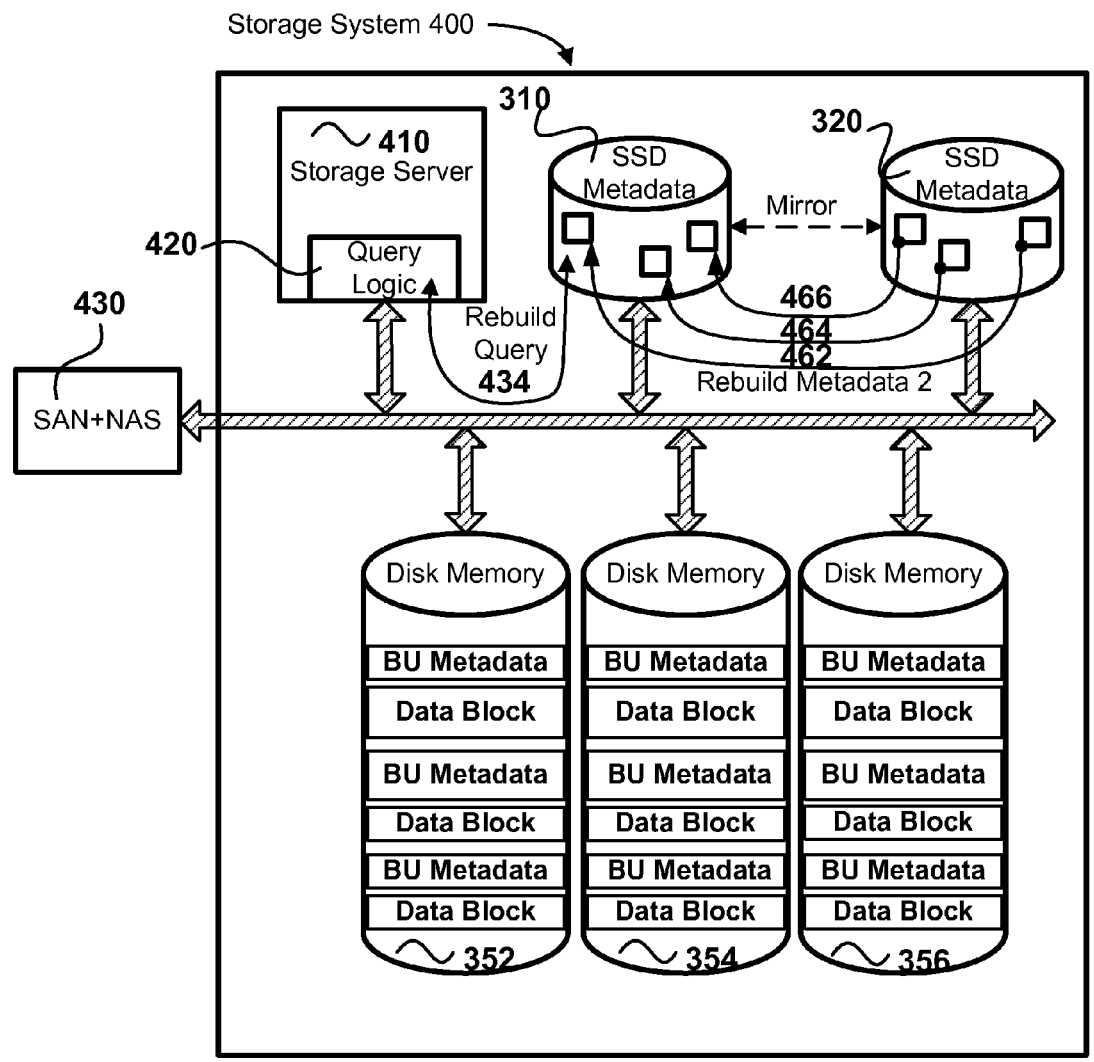
FIG. 9 is a block diagram of scalable metadata acceleration with datapath metadata backup for rebuilding accelerated metadata from one solid state device to another in accordance with an embodiment of the present disclosure.

FIG. 9 is a block diagram of scalable metadata acceleration with datapath metadata backup for rebuilding accelerated metadata from one solid state device to another in accordance with an embodiment of the present disclosure. The elements and features detailed above in FIG. 5 may be the same or similar in FIG. 9 as depicted in the storage system 400. The rebuild query 434 of the accelerated metadata 310 may determine that a rebuild or restore of the accelerated metadata is necessary and that the rebuild or restore metadata is to be read from the SSD metadata 320 and written into the accelerated SSD 310 via respective read operations 462, 464 and 466 labeled collectively as 'Rebuild Metadata 2.' The metadata transfer may be initiated the query logic 420 in the storage server 410. The rebuild metadata 2 process may also transfer through the data path 330 and the storage server 410 between the first SSD 310 and the second SSD 320.

Figure 10:
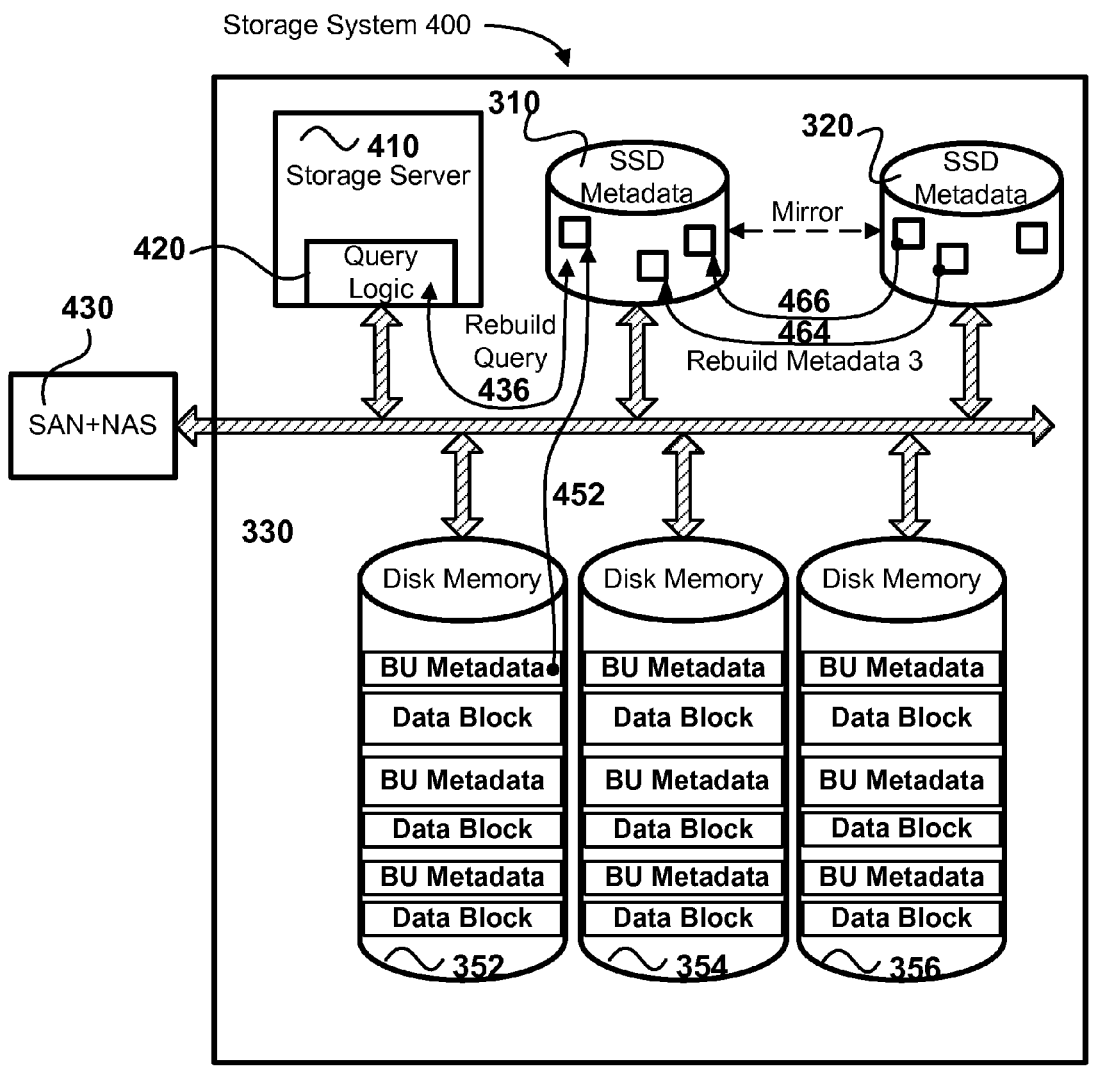
FIG. 10 is a block diagram of scalable metadata acceleration with datapath metadata backup for rebuilding accelerated metadata from a solid state device and a datapath metadata backup memory to another solid state device in accordance with an embodiment of the present disclosure.

FIG. 10 is a block diagram of scalable metadata acceleration with datapath metadata backup for rebuilding accelerated metadata from a solid state device and a datapath metadata backup memory to another solid state device in accordance with an embodiment of the present disclosure. The elements and features detailed above in FIG. 5 may be the same or similar as depicted in the storage system 400 of FIG. 10. A rebuild operation of the accelerated metadata may further comprise rebuilding failed accelerated metadata in one solid state memory 310 from one of the solid state memories 320 and the interleaved backup metadata per the table of block pointers. The rebuild query 436 of the accelerated metadata 310 may determine that a rebuild or restore of the accelerated metadata is necessary and that the rebuild or restore metadata is to be read from the interleaved backup metadata and the SSD 320. Therefore, metadata is gathered from the datapath disk 352 and written into the accelerated SSD 310 via the read operations 452. The process labeled as 'Rebuild Metadata 3 also includes the data transfers 464 and 466 or a copy of accelerated metadata from SSD 320 to 310.' The metadata transfer may be initiated by the storage server 410. The rebuild metadata 3 process may also transfer through the data path 330 and the storage server 410 between the first SSD 310, the second SSD 320 and the datapath disk 352.

Figure 11:
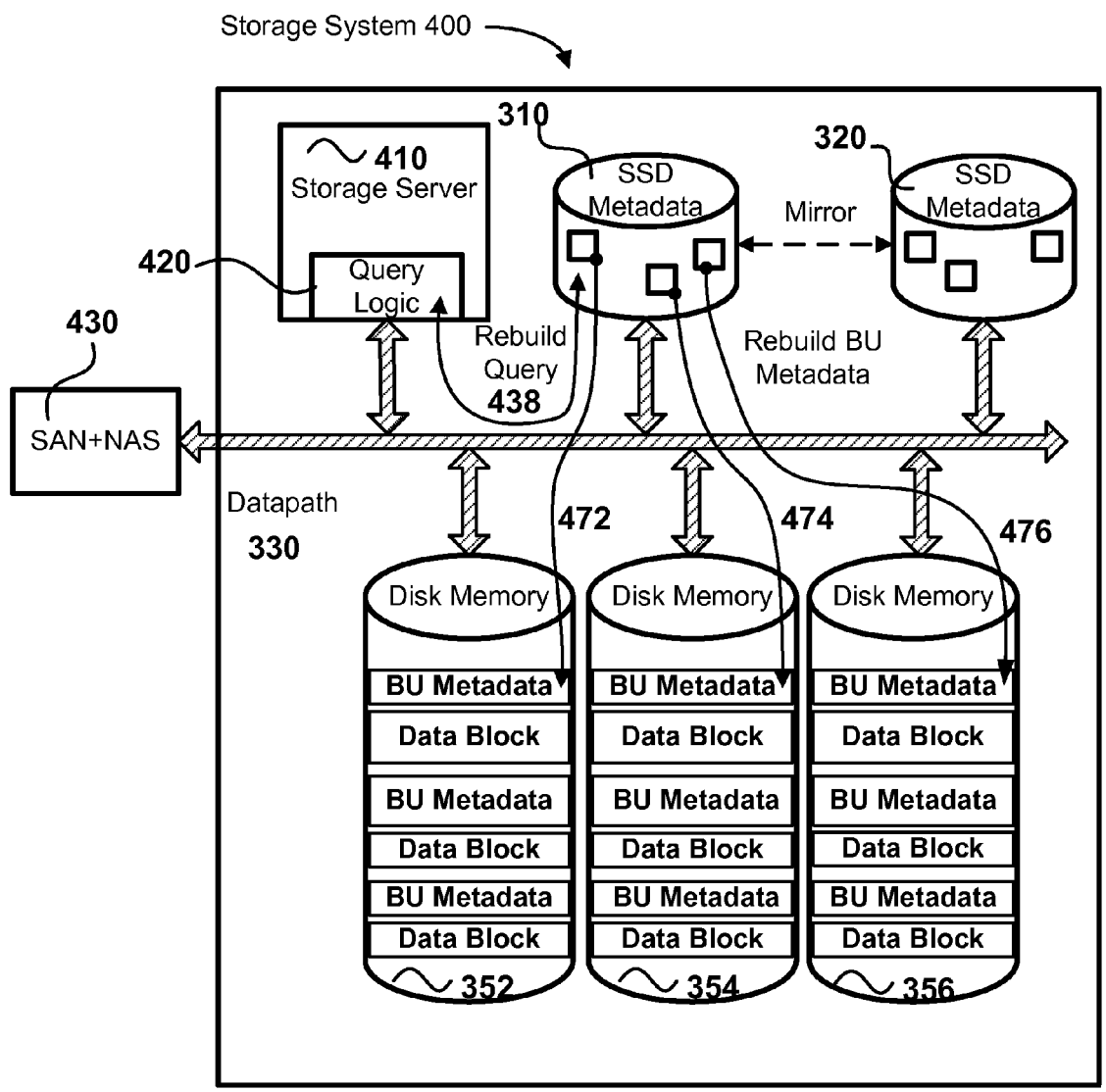
FIG. 11 is a block diagram of scalable metadata acceleration with datapath metadata backup for rebuilding a datapath metadata backup memory in accordance with an embodiment of the present disclosure.

FIG. 11 is a block diagram of scalable metadata acceleration with datapath metadata backup for rebuilding a datapath metadata backup memory in accordance with an embodiment of the present disclosure. The elements and features detailed above in FIG. 5 are the same or similar as depicted in the storage system 400 of the present figure. A rebuild operation or process of the datapath metadata 352, 354 and 356 may comprise reading the accelerated metadata 310 per the table of block pointers with optional offset. The direction of metadata flow in the 'Rebuild BU (backup) Metadata' operation is opposite to the direction of metadata flow in the rebuild metadata operation depicted in FIG. 8. Therefore, an embodiment may include querying 438 at least one of the accelerated metadata memories for a rebuild operation of a failed interleaved metadata. Therefore, metadata is gathered from the SSD 310 (or 320) and written to datapath disks 352, 354 and 356 and written via respective operations 452, 454 and 456. The metadata transfer may be initiated by the storage server 410 in response to a rebuild query 438 from the query logic 420. The rebuild BU metadata may also transfer through the data path 330 and the storage server 410 between the first SSD 310 and the datapath disks 352, 354 and 356.

Figure 12:
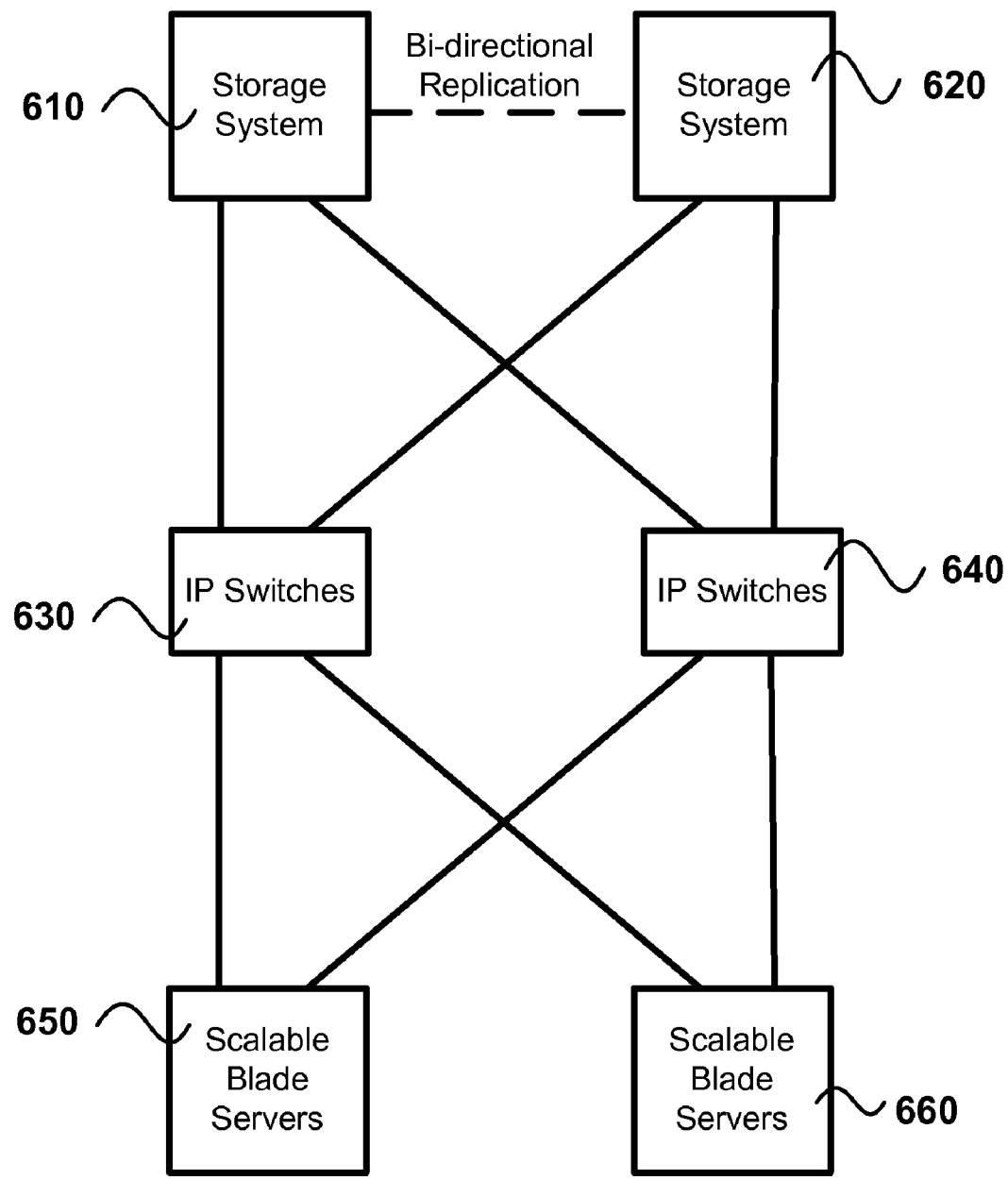
FIG. 12 is a block diagram of scalable metadata acceleration with datapath metadata backup including a virtual desktop platform in accordance with an embodiment of the present disclosure.

FIG. 12 is a block diagram of scalable metadata acceleration with datapath metadata backup including a virtual desktop platform in accordance with an embodiment of the present disclosure. Storage systems 610 and 620 may be similar or the same as storage system 400 as depicted in FIG. 4 including accelerated metadata SSD 310 and 320 arranged in a logical mirror configuration. Additionally, storage systems 610 and 620 may be arranged as logical minors of each other therefore providing a bidirectional replication of all data and metadata in the storage systems 610 and 620. The cross directional arrows from a storage system to an IP (internet protocol) switch and to a blade server indicate the ability of a storage system to read and write through either the IP switch 630 or 640 to either the scalable blade server 650 or the scalable blade server 660.

Figure 13:
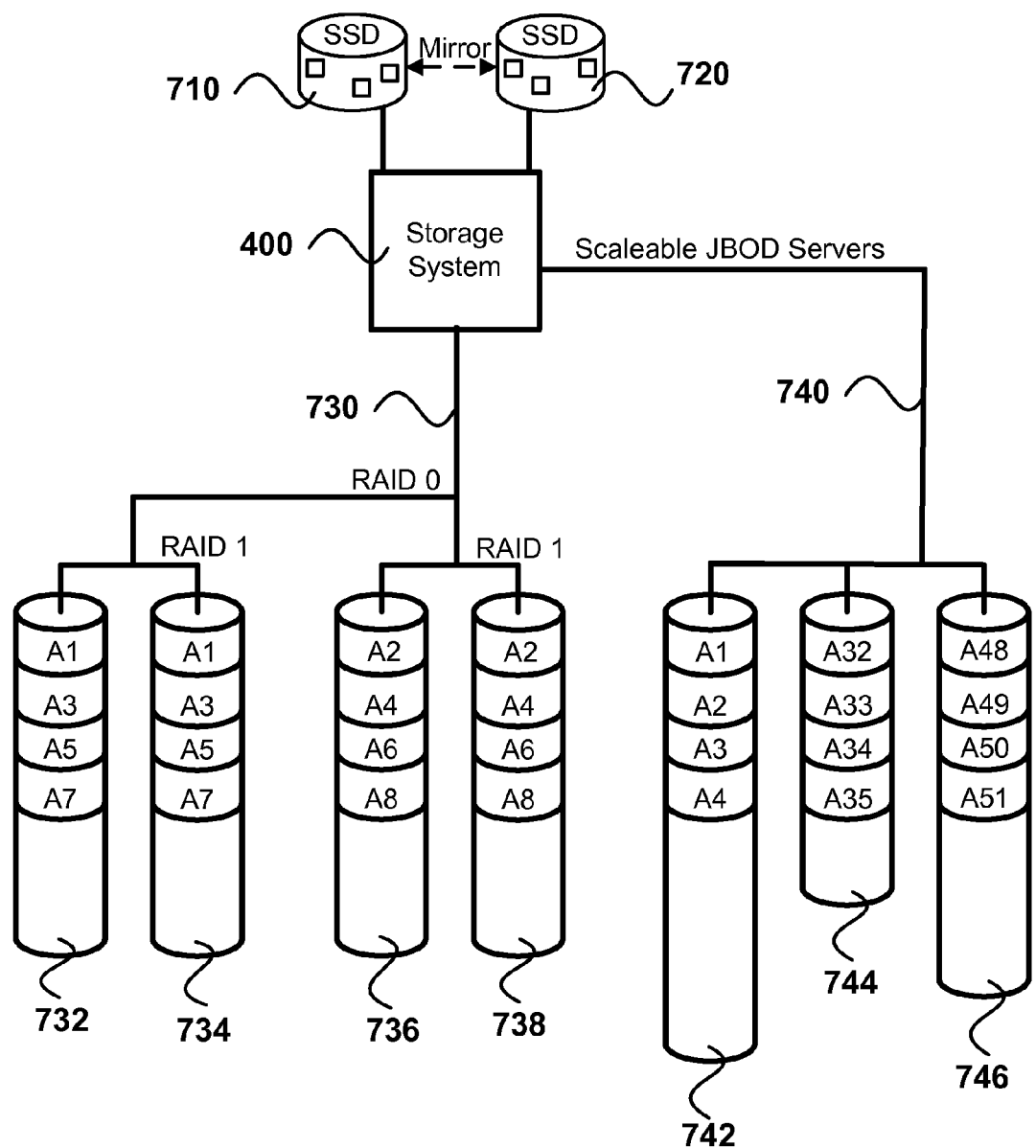
FIG. 13 is a block diagram of scalable metadata acceleration with datapath metadata backup depicting a RAID 1+0 and scalable JBOD disks in accordance with an embodiment of the present disclosure.

FIG. 13 is a block diagram of scalable metadata acceleration with datapath metadata backup depicting a RAID 1+0 and scalable JBOD (just a bunch of disks') disks in accordance with an embodiment of the present disclosure. Solid state metadata storage memories 310 and 320 (not depicted) may be scaled to include an additional pair multiple 710 and 720 in a RAID 1+0 configuration to accommodate a scalable datapath memory including a JBOD chassis slot expansion and the like. The storage system 700 may therefore include at least one storage system 400 as depicted and discussed above. The storage system may be directly connected to the RAID 1+0 disks 732, 734, 736 and 738 through the bus 730. The scalable JBOD disks 742, 744 and 746 may also be directly connected to the storage system 700 through the bus 740. A JBOD may concatenate disks together to form an effectively larger disk. Therefore the logical drive may be made of different physical drives. However, concatenation may not be done with RAID 0. A JBOD without redundancy is therefore comprised in an embodiment of the present disclosure. For example, JBOD may combine 3 GB, 15 GB, 5.5 GB, and 12 GB drives into a logical drive at 35.5 GB, which may be more useful than single drives alone. Data may therefore be concatenated from the end of disk 0 to the beginning of disk 1 and from the end of disk 1 to the beginning of disk 2 and so forth. In embodiments comprising RAID 0, disk 0 and disk 2 may be truncated to the size of the smallest disk in the array. Each drive may be also be logically separately in the operating system in an embodiment of the present disclosure. Scalability may therefore refer not only to adding more JBOD disk memory for data but also may refer to adding more accelerated memory SSD for metadata and for dataflow in the datapath (see the write cache 340 and the read cache 360 of FIG. 3).

Figure 14:
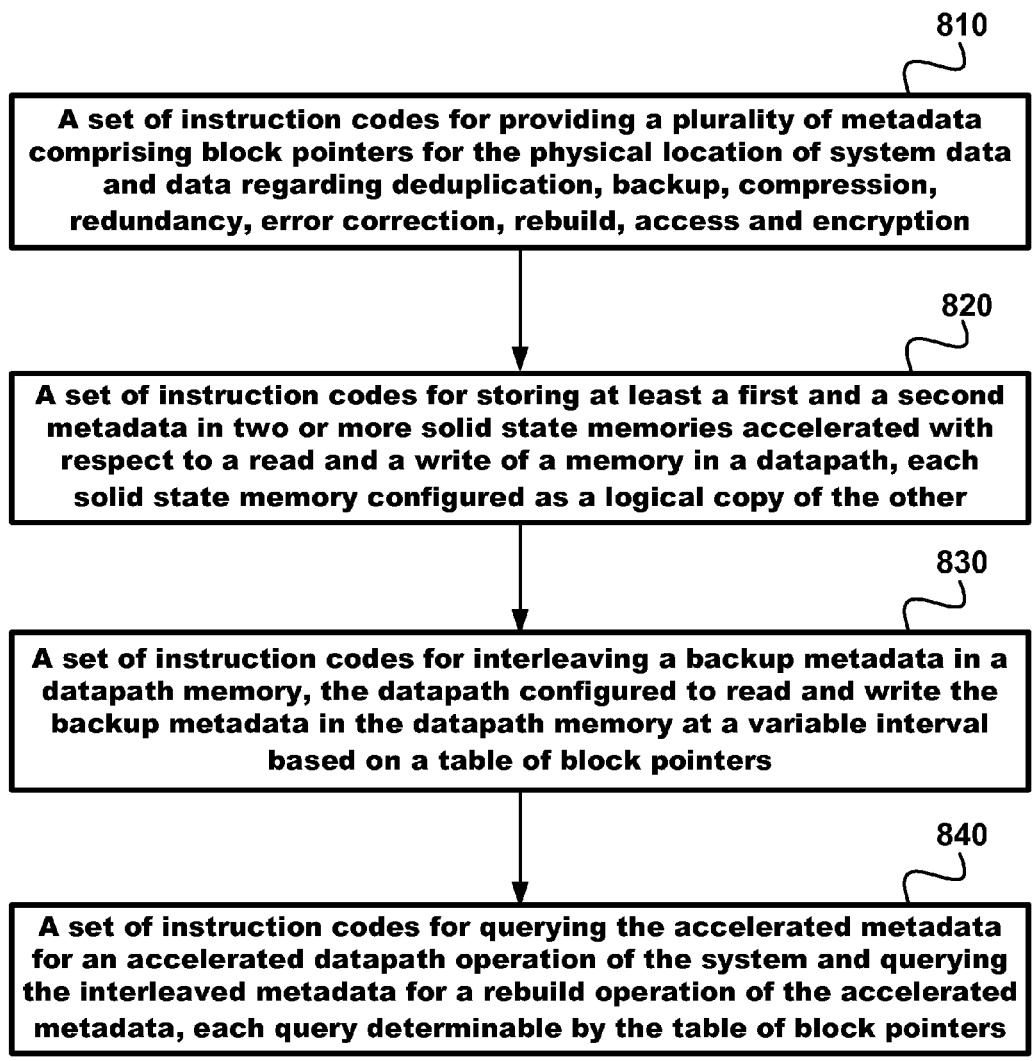
FIG. 14 is a flow chart of a computer program product for scalable metadata acceleration with datapath metadata backup via accelerated metadata in accordance with an embodiment of the present disclosure.

FIG. 14 is a flow chart of a computer program product for scalable metadata acceleration with datapath metadata backup in accordance with an embodiment of the present disclosure. The computer program product comprises a computer readable storage medium having computer useable instruction codes executable to perform operations for managing metadata of a storage system. The operations of the computer program product include providing 810 a plurality of metadata comprising block pointers for the physical location of system data and deduplication, compression, redundancy, error correction, rebuild, access and encryption data. The operations of the computer program product also include storing 820 at least a first and a second metadata of the metadata plurality in two or more solid state memories accelerated with respect to a read and a write of a memory in a datapath, each solid state memory configured as a logical copy of the other. The operations of the computer program product additionally include interleaving 830 a backup metadata in a datapath memory, the datapath memory configured to read and write the backup metadata in the datapath memory at a variable interval based on a table of block pointers. The operations of the computer program product further include querying 840 the accelerated metadata for an accelerated datapath operation of the system and querying the interleaved metadata for a rebuild operation of the accelerated metadata, each query determinable by the table of block pointers.

An embodiment of the computer program product wherein interleaving a backup metadata in a datapath memory may further comprise configuring the datapath to read and write the backup metadata in the datapath memory at a variable interval based on a table of variable block pointers and an interleaved metadata variable offset to a respective block pointer. Another embodiment of the computer program product, wherein a rebuild operation of the accelerated metadata may comprise rebuilding of failed accelerated metadata in one solid state memory from one of the solid state memories and the interleaved backup metadata per the table of block pointers. Embodiments of the computer program product may further comprising scaling the solid state memories to include an additional pair multiple in a RAID 1+0 configuration to accommodate a scalable datapath memory including a JBOD chassis slot expansion and the like.

Figure 15:
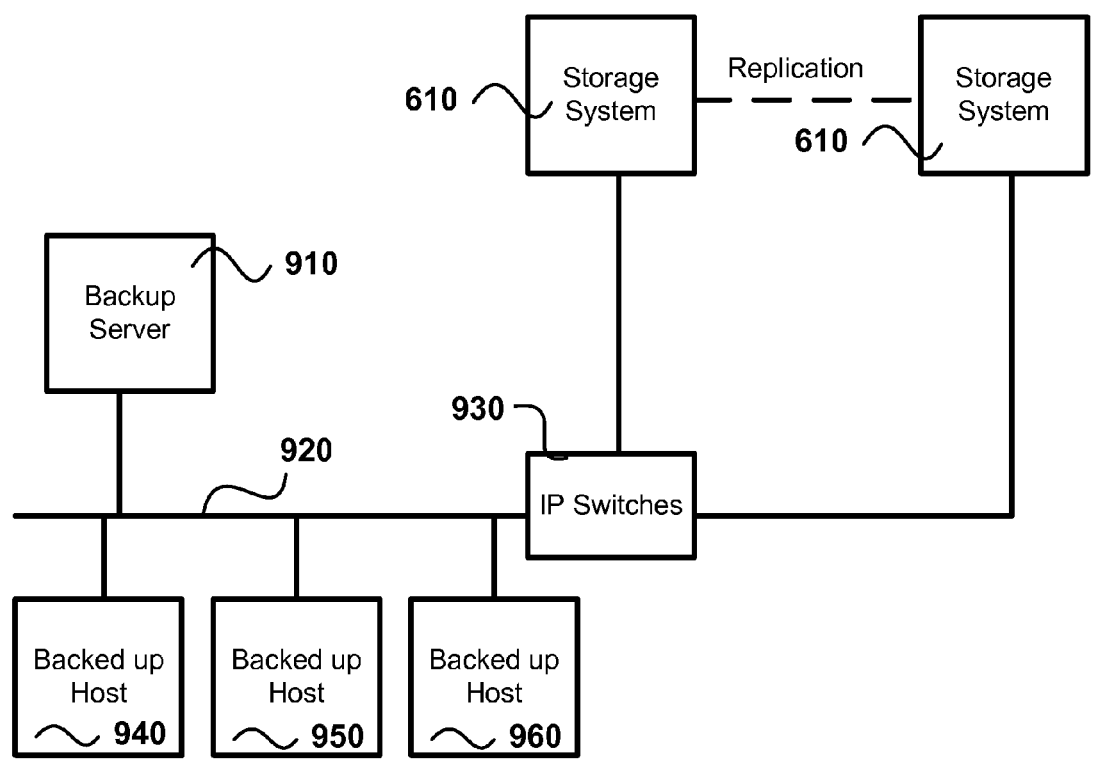
FIG. 15 a block diagram of an accelerated backup system for scalable metadata acceleration with datapath metadata backup in accordance with an embodiment of the present disclosure.

FIG. 15 is a block diagram of a backup system for scalable metadata acceleration with datapath metadata backup in accordance with an embodiment of the present disclosure. The backup system may comprise a storage system 600 and 620 arranged in a logical minor configuration. The backup system may also comprise a backup server 910, a datapath 920, IP switches 930 and backed up hosts 940, 950 and 960. The storage systems 610 and 620 may be the same or similar to the storage system 400 and comprise a plurality of metadata (see FIG. 2) comprising block pointers for the physical location of system data and data regarding deduplication, snapshot saves or backups, compression, redundancy, error correction, rebuild, access and encryption. The disclosed system may also include accelerated metadata management per a first and a second metadata of the plurality of metadata in two or more solid state memories accelerated with respect to a read and a write of a memory in a datapath, each solid state memory configured as a logical copy of the other. The disclosed system may further include a backup metadata interleaved in a datapath memory, the datapath configured to read and write the backup metadata in the datapath at a variable interval based on a table of block pointers. Furthermore, the disclosed system may include query logic configured to accelerate metadata for an accelerated datapath operation of the system and query the interleaved metadata for a rebuild operation of the accelerated metadata, each query determinable by the table of block pointers.

An embodiment of the scalable metadata acceleration with datapath metadata backup may further comprise data regarding error correction schemes, data compression algorithms, RAID level implemented on a data block and whether a block belongs to one of a file and a LUN with an offset address for SAN (storage area network) and NAS (network attached storage).

Another embodiment of the scalable metadata acceleration with datapath metadata backup disclosed may comprise an accelerated memory for a read and a write of data between a source memory and a destination memory, the accelerated memory accelerated with respect to a read and a write of a mechanical disk memory in a SAN. The scalable metadata acceleration with datapath metadata backup may further comprising scaling the solid state memories to include an additional pair multiple in a RAID 1+0 configuration to accommodate a scalable datapath memory including a JBOD chassis slot expansion and the like.

Therefore, because accelerated metadata is used for read and write operations of the datapath, all datapath operations of the disclosed storage system are accelerated. This enables the unaccelerated or non-accelerated metadata to be used for rebuild or restore operations of the accelerated metadata. The metadata backup may also be used to restore or rebuild accelerated metadata in combination with a mirrored copy of the metadata or the mirrored copy may be used exclusively in the rebuild.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents.

What is claimed is:

1. A method for managing metadata of a storage system, comprising:
   a) providing a plurality of metadata comprising block pointers for physical locations of system data and deduplication, backup, compression, redundancy, error correction, rebuild, access and encryption data;
   b) storing at least a first and a second metadata of the metadata plurality in two or more solid state memories accelerated with respect to a read and a write of a memory in a datapath, each solid state memory configured as a logical copy of the other;
   c) interleaving a backup metadata in a datapath memory, the datapath configured to read and write the backup metadata in the datapath memory at a variable interval based on a table of block pointers; and
   d) querying accelerated metadata for an accelerated datapath operation of the system and querying the interleaved metadata for a rebuild operation of the accelerated metadata, each query determinable by the table of block pointers.

2. The method for managing metadata of a storage system of claim 1, wherein the plurality of metadata further comprises information regarding error correction schemes, data compression algorithms, RAID (redundant array of independent disks/devices) level implemented on a data block and whether a block belongs to one of a file and a LUN (logical unit number) with an offset address for SAN (storage area network) and NAS (network attached storage).

3. The method for managing metadata of a storage system of claim 1, wherein interleaving the backup metadata in the datapath memory further comprises configuring the datapath to read and write the backup metadata in the datapath memory at a variable interval based on a table of variable block pointers and an interleaved metadata variable offset to a respective block pointer.

4. The method for managing metadata of a storage system of claim 3, wherein the metadata interleaved in the datapath is interleaved at a plurality of variable intervals determined by the table of variable block pointers and the interleaved metadata variable offset to the respective block pointer.

5. The method for managing metadata of a storage system of claim 1, wherein each solid state memory is configured in any logical mirror arrangement and any RAID arrangement.

6. The method for managing metadata of a storage system of claim 1, wherein the two or more solid state memories may comprise a non-volatile semiconductor memory, a ferroelectric RAM (random access memory), a magneto-resistive RAM, a DRAM (dynamic random access memory), an SRAM (static random access memory) memory and any combination of solid state memory.

7. The method for managing metadata of a storage system of claim 1, further comprising performing an inline data compression/decompression and depuplication of the accelerated metadata during a read of the datapath and a write of the datapath.

8. The method for managing metadata of a storage system of claim 1, further comprising updating the accelerated metadata and updating the backup metadata concurrently and thereby accelerating a write of the interleaved backup metadata.

9. The method for managing metadata of a storage system of claim 1, wherein a rebuild operation of the accelerated metadata comprises reading the interleaved backup metadata from the datapath memory per the table of block pointers into the accelerated metadata.

10. The method for managing metadata of a storage system of claim 1, wherein a rebuild operation of the accelerated metadata further comprises rebuilding failed accelerated metadata in one solid state memory from one of the solid state memories and the interleaved backup metadata per the table of block pointers.

11. The method for managing metadata of a storage system of claim 1, further comprising querying at least one of the accelerated solid state memories for a rebuild operation of a failed interleaved metadata.

12. The method for managing metadata of a storage system of claim 1, further comprising scaling the solid state memories to include an additional pair multiple in a RAID 1+0 configuration to accommodate a scalable datapath memory including a JBOD (just a bunch of disks) chassis slot expansion.

13. A computer program product comprising a non-transitory computer readable storage medium having computer useable instruction codes executable to perform operations for managing metadata of a storage system, the operations of the computer program product comprising:
    a) providing a plurality of metadata comprising block pointers for physical locations of system data and deduplication, compression, redundancy, error correction, rebuild, access and encryption data;
    b) storing at least a first and a second metadata of the metadata plurality in two or more solid state memories accelerated with respect to a read and a write of a memory in a datapath, each solid state memory configured as a logical copy of the other;
    c) interleaving a backup metadata in a datapath memory, the datapath memory configured to read and write the backup metadata in the datapath memory at a variable interval based on a table of block pointers; and
    d) querying accelerated metadata for an accelerated datapath operation of the system and querying the interleaved metadata for a rebuild operation of the accelerated metadata, each query determinable by the table of block pointers.

14. The computer program product of claim 13, wherein interleaving the backup metadata in the datapath memory further comprises configuring the datapath to read and write the backup metadata in the datapath memory at a variable interval based on a table of variable block pointers and an interleaved metadata variable offset to a respective block pointer.

15. The computer program product of claim 13, wherein a rebuild operation of the accelerated metadata further comprises rebuilding failed accelerated metadata in one solid state memory from one of the solid state memories and the interleaved backup metadata per the table of block pointers.

16. The computer program product of claim 13, further comprising scaling the solid state memories to include an additional pair multiple in a RAID 1+0 configuration to accommodate a scalable datapath memory including a JBOD (just a bunch of disks) chassis slot expansion.

17. A storage system with metadata management, comprising:
    a) a plurality of metadata comprising block pointers for physical locations of system data and deduplication, snapshot saves, compression, redundancy, error correction, rebuild, access and encryption data;
    b) at least a first and a second metadata of the metadata plurality in two or more solid state memories of the storage system accelerated with respect to a read and a write of a memory in a datapath, each solid state memory configured as a logical copy of the other;
    c) a backup metadata interleaved in a datapath memory, the datapath configured to read and write the backup metadata in the datapath at a variable interval based on a table of block pointers; and
    d) a query logic configured to accelerate metadata for an accelerated datapath operation of the system and query the interleaved metadata for a rebuild operation of the accelerated metadata, each query determinable by the table of block pointers.

18. The storage system with metadata management of claim 17, wherein the plurality of metadata further comprises data regarding error correction schemes, data compression algorithms, RAID (redundant array of independent disks/devices) level implemented on a data block and whether a block belongs to one of a file and a LUN (logical unit number) with an offset address for SAN (storage area network) and NAS (network attached storage).

19. The storage system with metadata management of claim 17, wherein the datapath comprises an accelerated memory for a read and a write of data between a source memory and a destination memory, the accelerated memory accelerated with respect to a read and a write of a mechanical disk memory in a storage area network (SAN).

20. The storage system with metadata management of claim 17, further comprising scaling the solid state memories to include an additional pair multiple in a RAID 1+0 configuration to accommodate a scalable datapath memory including a JBOD (just a bunch of disks) chassis slot expansion.

* * * * *